(12) United States Patent
Brittain et al.

(10) Patent No.: US 7,600,091 B2
(45) Date of Patent: *Oct. 6, 2009

(54) EXECUTING BACKGROUND WRITES TO IDLE DIMMS

(75) Inventors: Mark Andrew Brittain, Pflugerville, TX (US); Warren Edward Maule, Cedar Park, TX (US); Gary Alan Morrison, Austin, TX (US); Jeffrey Adam Stuecheli, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/951,735

(22) Filed: Dec. 6, 2007

(65) Prior Publication Data

US 2008/0091905 A1 Apr. 17, 2008

Related U.S. Application Data

(63) Continuation of application No. 11/054,447, filed on Feb. 9, 2005, now Pat. No. 7,373,471.

(51) Int. Cl.
*G06F 12/00* (2006.01)
(52) U.S. Cl. ..................................... 711/167
(58) Field of Classification Search ........................ None
See application file for complete search history.

(56) References Cited

U.S. PATENT DOCUMENTS 5,590,299 A * 12/1996 Bennett .......................... 711/5
6,807,609 B1 * 10/2004 Lemmon et al. ............. 711/150
7,277,988 B2 * 10/2007 Gower et al. ................. 711/118

* cited by examiner

*Primary Examiner*—Hiep T Nguyen
(74) *Attorney, Agent, or Firm*—Dillon & Yudell LLP (57) ABSTRACT

Memory modules are designed with multiple write buffers utilized to temporarily hold write data. "Write-to-buffer" operations moves write data from the memory controller to the write buffers while the memory module is busy processing read operations. Then, address-only "write" commands are later issued to write the buffered write data to the memory device. The write commands targeting idle DIMMs are issued in sequence ahead of writes targeting busy DIMMs (or soon to be busy). Moving the data via a background write-to-buffer operation increases the efficiency of the common write data channel and allows the write data bus to reach maximum bandwidth during periods of heavy read activity. The actual write operations, deferred to periods of when the negative affects of the write can be completely/mostly hidden. In periods of light read activity or when there are no reads pending, buffering data in the memory module enables the buffered data to be written in parallel across multiple memory modules simultaneously.

14 Claims, 10 Drawing Sheets

EXECUTING BACKGROUND WRITES TO IDLE DIMMS

PRIORITY CLAIM

The present application is a continuation of U.S. patent application Ser. No. 11/054,447, entitled, "Executing Background Writes to Idle DIMMs, filed Feb. 9, 2005 now U.S. Pat. No. 7,373,471.

CROSS REFERENCE TO RELATED APPLICATION(S)

The present invention is related to the following commonly assigned, co-pending applications: Single Burst Completion of Multiple Writes at Buffered DIMMs," Ser. No. 11/054,372, and "Streaming Reads for Early Processing in a Cascaded Memory Subsystem With Buffered Memory Modules," Ser. No. 11/054,446, all filed concurrently herewith. The contents of the above applications are incorporated herein by reference.

BACKGROUND OF THE INVENTION

1. Technical Field

The present invention relates generally to computer devices and in particular to memory subsystems. Still more particularly, the present invention relates to a method and system for efficiently completing write operations within memory subsystems.

2. Description of Related Art

Improvements in computer memory subsystems continue to be one of the major developments that enable more efficient and faster computer systems. A historical perspective of the evolution of computer memory subsystems is provided in commonly assigned and co-pending patent application Ser. No. 10/903,178, and its related applications, relevant content of which is incorporated herein by reference.

Figure 2A:
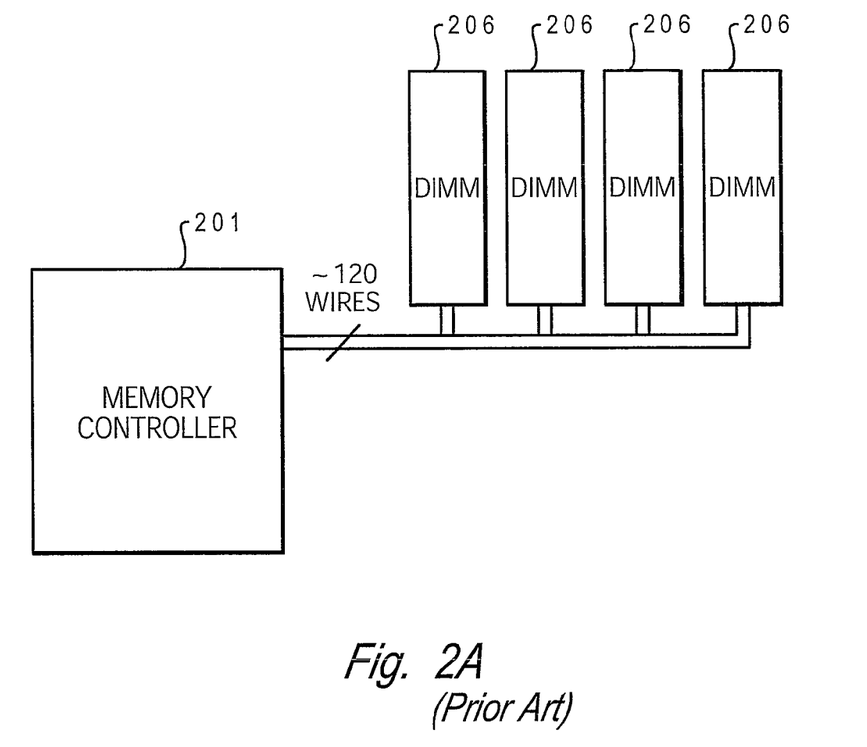
FIGS. 2A and 2B depict two illustrations of a memory subsystem with DIMMS dotted to the same address and data buses according to the prior art.
Figure 2B:
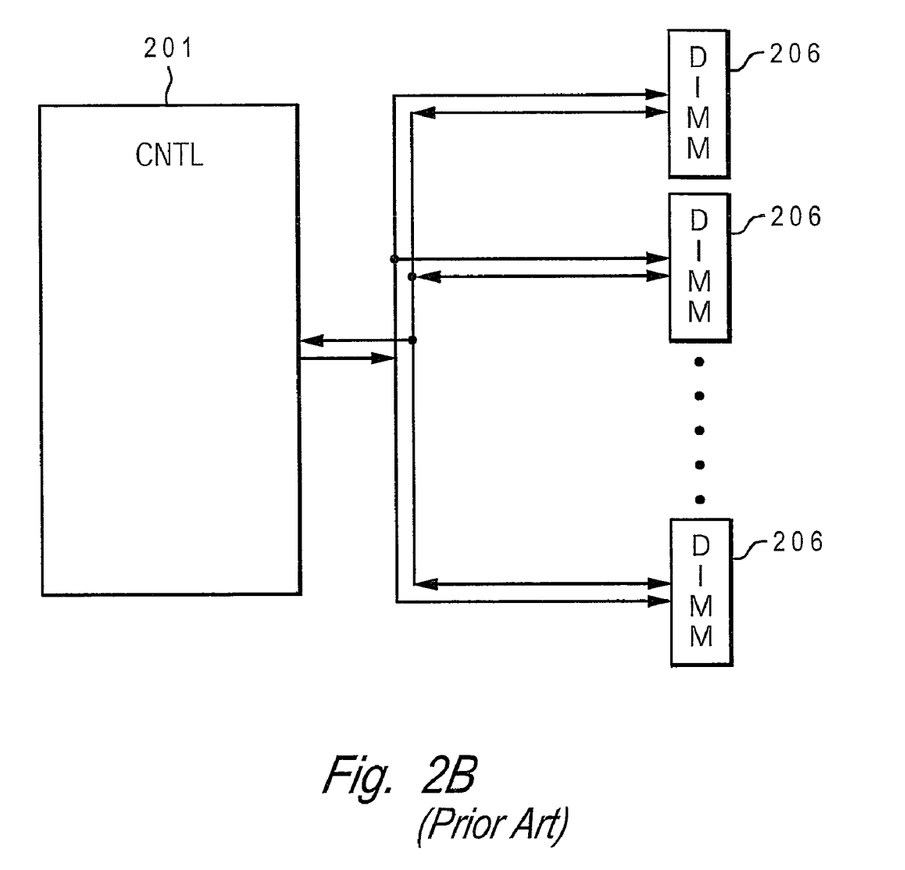

As recited in that application, computer memory subsystems have evolved from point-to-point bus topology of the early 1980's (e.g., U.S. Pat. No. 4,475,194) to more recent computer memory subsystems, which includes up to four registered dual inline memory modules (DIMMs) on a traditional multi-drop stub bus channel (e.g., U.S. Pat. No. 6,510,100). This latter structure has inherent limits on the number of modules that may be attached to the stub bus due to the increasing data rate of the information transferred over the bus. FIGS. 2A and 2B illustrate prior art memory subsystems configured with multiple DIMMs 206 connected to a memory controller 201 via a stub bus topology. As shown, all memory modules (DIMMs) 206 connect directly to a single system address/command bus and a single system bi-directional data bus.

Figure 1:
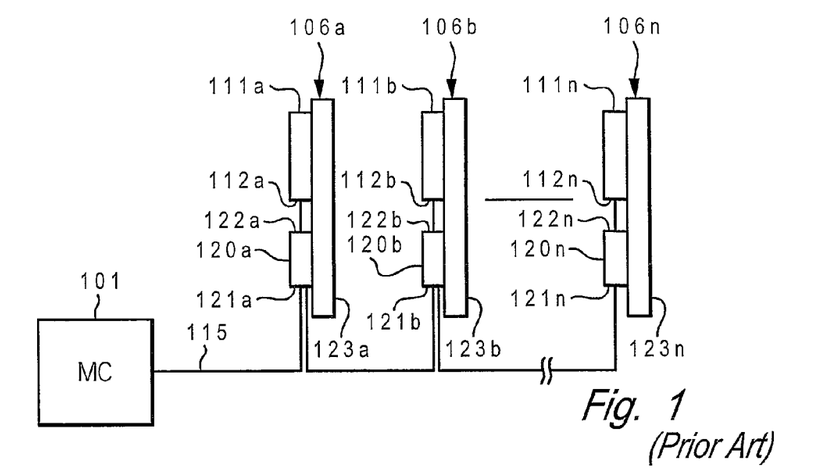
FIG. 1 depicts a prior art daisy chain connection between a memory controller and memory modules.

Further development led to the introduction of the daisy chain topology (U.S. Pat. No. 4,723,120), which provides point-to-point interfaces to separate devices. FIG. 1 illustrates a prior art daisy-chained memory channel, implemented consistent with the teachings in U.S. Pat. No. 4,723,120. According to the configuration, memory controller 101 is connected to a memory channel 115, which further connects to a series of memory modules 106a-n. Each module 106a-n includes a DRAM 111a-n and a buffer 120a-n. The information on memory channel 115 is re-driven by the buffer 120a on module 106a to the next module 106b, which further re-drives the channel 115 to module positions denoted as 106n. Within conventional systems, each memory module is a dynamic inline memory module (DIMM).

Read Operations

One drawback to the use of a daisy chain bus topology is increased latency associated with the return of read data via the series of daisy chained memory modules. Because each module in the channel has a different number of intervening stages to return data to the memory controller, each module has different latency for returning data to the memory controller. The variations in latencies among memory modules present a management problem for the memory controller, particularly since collisions on the memory channel have to be avoided.

One solution presented for handling these varying latencies associated with the memory modules involves leveling the read data latency of all the modules by setting the latency of modules closer to the memory controller (i.e., those with shorter latencies) equal to the latency of the module that is furthest away from the memory controller in the chain. Leveling the data return latency in this manner can be achieved by adding a fixed amount of delay to the return of read data based on the data's location in the channel. In this way, the memory controller will receive all read data with the same latency following the issuance of the read request/command, regardless of the location of the target memory module within the chain.

Additional cycles of delay were thus added to each of the closer memory modules and these delays were coded into the buffer logic of the memory module. The buffer logic is then used to delay the placement of the requested data on the memory channel for the preset number of cycles to allow for equal return data latencies.

Forcing all read operations to complete at the worst-case latency severely limits the efficiency of the memory subsystem and adds unnecessary delays in the data retrieval process. Further, with the prior art implementation, read requests must be issued at fixed times to line up with openings in the returning data stream. This requirement can result is unused data cycles on the read data channel when there is a conflict between two commands that need to be issued on the address bus. The combination of these two requirements limits the efficiency of the memory channel by adding unnecessary latency and idle cycles on the memory data channel.

One advantage of the daisy chained implementation is that each memory module installed on the data channel has an independent data bus to its DRAMs. Although all the memory modules share the same data channel back to the memory controller, they individually have a separate data bus that is isolated from the memory channel by the buffer chip. Data bandwidth in a DRAM memory system is affected by a number of DRAM architecture requirements, and the data bus bandwidth generally falls well short of the maximum available bandwidth of the common data bus, in this case the daisy chained memory channel. Therefore having multiple independent data buses driving a single memory channel may significantly increase the data bandwidth available in the system.

In the prior art implementations of the daisy channel memory system the requirement that all memory modules return data with the latency of the last memory module in the chain effectively results in a configuration where all the memory module data buses run as if they were one bus. This reduces the available bandwidth in the system back to that provided by the traditional multi-drop stub bus configurations and results in inefficient usage of the data bandwidth on the daisy chained memory channel.

Write Operations

Handling write operations also presents a management issue for the memory controller. Similar to reads, write operations are received in time order at the memory controller and are often forwarded by the memory controller to the target memory module at a first free/available cycles on the shared read/write address bus and data bus. In conventional memory subsystems, read operations are given higher priority by the memory controller since the read data is needed for current processing, while the write data is merely being archived following processing of the data. Thus, issuing a write operation utilizes bus bandwidth that may be allocated to a read that is waiting to be issued.

Write operations and read operations share a common address/control bus on the memory channel between the memory controller and memory modules, and on the memory module they share a common address and data bus (i.e., between the memory module's control logic and memory devices, e.g., DRAMs). For the memory controller to issue a write to a memory module, two factors have to be accounted for. The first factor is the availability of the system's address/control bus to the memory module. The second factor is the availability of the memory module's data and address buses.

With the first and second factors, memory modules that are busy processing reads are considered busy and cannot be written to. Each individual write operation is thus held (prevented from executing) until read operations are no longer busying the memory module. If a new read is sent out to a particular memory module as the previous read completes, the individual write operation is made to wait indefinitely until the memory module is not the target of a next read operation.

With the second factor above, since both write and read operations are completed via a single bi-directional data bus within the memory module, switching from a read operation to a write operation, and vice-versa, requires a reconfiguration of the bi-directional memory bus to allow the data to be transmitted towards the DRAM (for writes) and from the DRAM (for reads). The reconfiguration process takes several clock cycles to complete and injects a large performance penalty associated with the latency of completing read operations that follow a write operation to the same memory module. Additionally, it is common for multiple writes to be received at the memory controller, each targeting the same memory module. In conventional systems, each write is processed as an individual write operation, leading to a huge performance penalty for the single memory module targeted by multiple writes interjected between the read operations at that memory module.

Since completing write operations are of less priority than completing reads, individual completion of multiple write operations to the same memory module negatively affects the overall efficiency of the memory module in providing read data. The present invention thus recognizes that it would be desirable to enable completion of writes in the background when their target memory modules are idle. The invention further recognizes that it would be desirable to hide the inefficiencies of the DRAM architecture due to the busy time incurred after each operation. Finally, the invention recognizes the desirability of reducing the performance penalty associated with individually completing each of multiple write operations interjected between reads targeting the same memory module.

SUMMARY OF THE INVENTION

Disclosed is a method and system for efficiently completing write operations within a memory subsystem without adversely affecting the completion of issued reads and return of read data from buffered memory modules. Each memory module (e.g., DIMM) includes memory devices (e.g., DRAMs), multiple write buffers, and control logic. The write buffers are utilized to temporarily hold write data before the write data are written to the memory device.

Two write operations are provided by the memory controller in place of each received write. A "write-to-buffer" operation moves write data from the memory controller to one of the write buffers within the memory module. Then, a "write" (address-only) operation is later issued to write the buffered write data to the memory device.

Using the write-to-buffer command, write data may be issued to a memory module even though the target memory module is busy processing reads. Since the write data is sent to the write buffers of the memory module, the processing of reads is not affected, and the process of forwarding the write data is thus hidden behind ongoing read operations. This function of forwarding data to buffers of each of the memory modules is continuously completed in the background regardless of the busy state of the respective DIMMS that are targeted. The number of data transfers for write operations that may be sent to the memory modules prior to the first write command being issued is only limited by the number of buffers in the memory modules.

Moving the data via a background write-to-buffer operation increases the efficiency of the common write data channel by allowing write data to be moved to the buffers in the memory modules even though there are no idle memory devices to currently accept the associated write operation. This feature allows the write data bus to reach maximum bandwidth during periods of heavy read activity, and the actual write operations to the memory devices are deferred to periods of light read activity, where the buffered data is able to be written in parallel across multiple memory modules simultaneously.

The latter, address-only write commands to different buffered memory modules are re-ordered so that the writes targeting idle DIMMs are issued ahead of writes targeting DIMMs that are busy (or soon to be busy). Idle DIMMs are determined by logic within the controller, which is utilized to control the issuance of writes and reads to the various DIMMs. In one embodiment, the controller logic determines that a DIMM is idle when the read queue of the memory controller does not contain any reads that target the particular DIMM to which the write operation is addressed.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF ILLUSTRATIVE EMBODIMENTS

The present invention provides a method and system for efficiently completing write operations within a memory subsystem without adversely affecting the completion of issued reads and return of read data from buffered memory modules. Each memory module (e.g., DIMM) includes memory devices (e.g., DRAMs), multiple write buffers, and control logic. The write buffers are utilized to temporarily hold write data before the write data is written to the memory device.

Two primary enhancements to the processing of write operations are presented below and are directly related to the new method of processing reads described in co-related patent application, Ser. No. 11/054,446. The contents of that related application is presented below to enable an understanding of the complete system environment within which both inventions are practiced.

For simplicity in describing the invention, the memory modules are assumed to be dual inline memory modules (DIMMs) and the memory devices are assumed to be Dynamic Random Access Memory (DRAMs). These modules contain multiple DRAMs arranged in groups to form one or more ranks of memory with each rank of memory containing one or more banks of memory. Those skilled in the art appreciate that specific references to these components, namely DIMMs and DRAMs, are not meant to be limiting on the invention, which finds applicability in any memory module having one or more memory devices thereon. These terms are utilized interchangeably throughout the description.

As described herein, issuing each read operation from the memory controller to a bank of memory on a memory module takes a known number of cycles (N), and a next read cannot be issued to that individual memory bank until N cycles following the previous read. This is referred to as the busy time of the memory bank. A second factor in issuing read operations is the busy time of the data bus. When a read is issued to a memory bank on a memory module, the result is a data packet that is generally 4 or 8 data cycles in length. Since all data uses a common data bus within the memory module another read cannot be issued within a 4 or 8 cycle window (depending on the data length of the previous read operations) of the first read operation. The two of these busy times are referred to within this invention as the memory module busy time References to sequential issuing of reads to the system's address/command/control bus refer to issuing a next read at the next available command cycle at which a read may be issued.

One aspect of the invention removes this built in delay of cycles for issuing subsequent reads by buffering the data returned by the read operation for a number of cycles calculated to prevent the data collisions on the system data bus. Thus, according to the invention, the issuance of multiple reads is completed over sequential read cycles so that reads occur in parallel across the different memory modules, and the memory module targeted by the read operation is returned from a busy state earlier than with conventional issuance of reads.

As described by related application Ser. No. 11/054,446, the accessed memory module returns from a busy state early by placing the retrieved read data in one of the available read buffers. Subsequent reads to the same memory module may be scheduled earlier because the previous reads were issued early to the memory module and processed early by storing the data within the buffers. The early retrieval of data from the DRAMs enables the memory module to become idle for handling other processes even before the previously retrieved data is scheduled to be returned to the memory controller.

In one embodiment, rather than provide buffers on the memory modules, the read and write buffers associated with each memory module are built on the backplane of the memory subsystem. The memory modules (DIMMs) are plugged into slots connected to the respective set of buffers and buffering of data retrieved from the DRAMs (read buffers) or being sent to the DRAMs (write buffers) occurs similarly to when the buffers are on the memory modules themselves. Larger numbers of buffers may then be provided for each memory module, which is able to accommodate more onboard memory devices.

Handling Reads in Cascade Memory Modules with Varying Latencies

Exemplary embodiments of the present invention provide circuits and methods that enable positional read data latency for a memory channel comprised of cascaded, buffered memory modules. The use of positional read data latency for a memory channel (also referred to herein as a memory subsystem) may lead to increased memory channel performance.

Exemplary embodiments of the present invention include a packetized multi-transfer interface which utilizes an innovative communication protocol to permit memory operation to occur on a reduced pincount, whereby address, command and data is transferred between the components on the cascaded bus over multiple cycles, and are reconstructed and errors corrected prior to being used by the intended recipient.

Figure 3A:
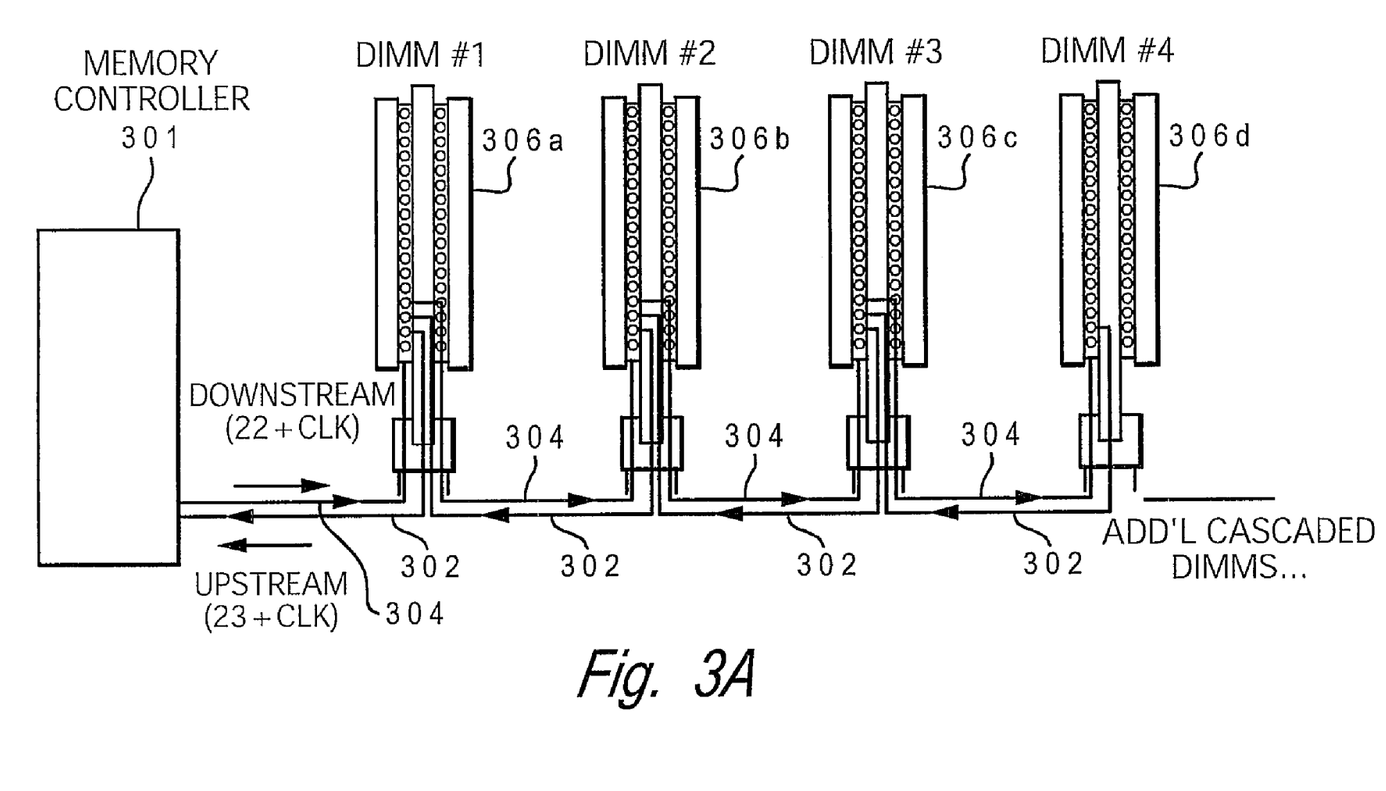
FIGS. 3A and 3B depict two illustrations of cascaded memory modules of a memory subsystem connected via unidirectional point-to-point busses according to two exemplary embodiments of the present invention.
Figure 3B:
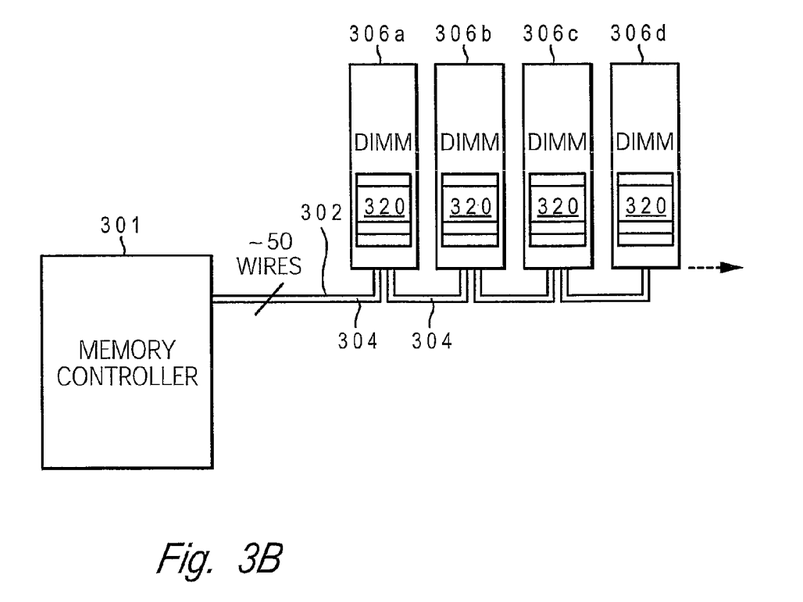

FIGS. 3A and 3B depict two configurations of a memory subsystem with cascaded, buffered memory modules and unidirectional busses that are utilized by exemplary embodiments of the present invention. This memory structure includes a memory controller 301 in communication with one or more memory modules 306*a-d* via a high speed point-to-point bus 304. One of the functions provided by the memory modules 306*a-d* in the cascade structure is a re-drive function to send signals on the memory bus to other memory modules 306*a-d* or to the memory controller 301. FIG. 3A-3B include the memory controller 301 and four memory modules 306*a*-306*d*, on each of two memory busses, a downstream memory bus (address/command/control bus) 304 and an upstream memory bus (or memory channel) 302, connected to the memory controller 302. Memory module 306*a* is connected to the memory controller 301 in a direct manner. Memory modules 306*b*, 306*c* and 306*d* are connected to the memory controller 301 in a cascaded manner.

The memory controller 301 interfaces to the memory modules 306 via a pair of high speed busses (or channels). An exemplary embodiment of the present invention includes two uni-directional busses between the memory controller 301 and memory module 306a ("DIMM #1"), as well as between each successive memory module 306b-d ("DIMM #2", "DIMM #3" and "DIMM #4") in the cascaded memory structure. The downstream memory bus 304 (outbound from the memory controller 301) interface has twenty-four pins and the upstream memory bus 302 (inbound to the memory controller 301) interface has twenty-five pins.

The downstream memory bus 304 is used to transfer address, control, write data and bus-level error code correction (ECC) bits downstream from the memory controller 302, over several clock cycles, to one or more of the memory modules 306 installed on the cascaded memory channel. The upstream memory bus 302 is used to transfer read data and bus-level ECC bits upstream from the sourcing memory module 306 to the memory controller 301. Using this memory structure, and a four to one data rate multiplier between the DRAM data rate (e.g., 400 to 200 Mb/s per pin) and the unidirectional memory bus data rate (e.g., 1.6 to 2.2 Gb/s per pin), the memory controller 301 signal pin count, per memory channel, is reduced from approximately one hundred and twenty pins to about fifty pins.

Due to the cascaded memory structure, all nets are point-to-point, allowing reliable high-speed communication that is independent of the number of memory modules 306 installed. Whenever a memory module 306 receives a packet on either bus, it re-synchronizes the command to the internal clock and re-drives the command to the next memory module 306 in the chain (if one exists).

Each bus 304 in the exemplary embodiment depicted in FIG. 3A-3B includes approximately fifty high speed wires for the transfer of address, command, data and clocks. By using point-to-point busses as described in the aforementioned prior art, it is possible to optimize the bus design to permit significantly increased data rates, as well as to reduce the bus pincount by transferring data over multiple cycles. An exemplary embodiment of the present invention, as depicted in FIG. 3A-3B, provides a four to one bus speed ratio to maximize bus efficiency and to minimize pincount.

Although point-to-point interconnects permit higher data rates, overall memory subsystem efficiency must be achieved by maintaining a reasonable number of memory modules 306 and memory devices per channel (historically four memory modules with four to thirty-six chips per memory module, but as high as eight memory modules per channel and as few as one memory module per channel). Using a point-to-point bus necessitates a bus re-drive function on each memory module. The re-drive function permits memory modules to be cascaded such that each memory module is interconnected to other memory modules, as well as to the memory controller 301.

Figure 4:
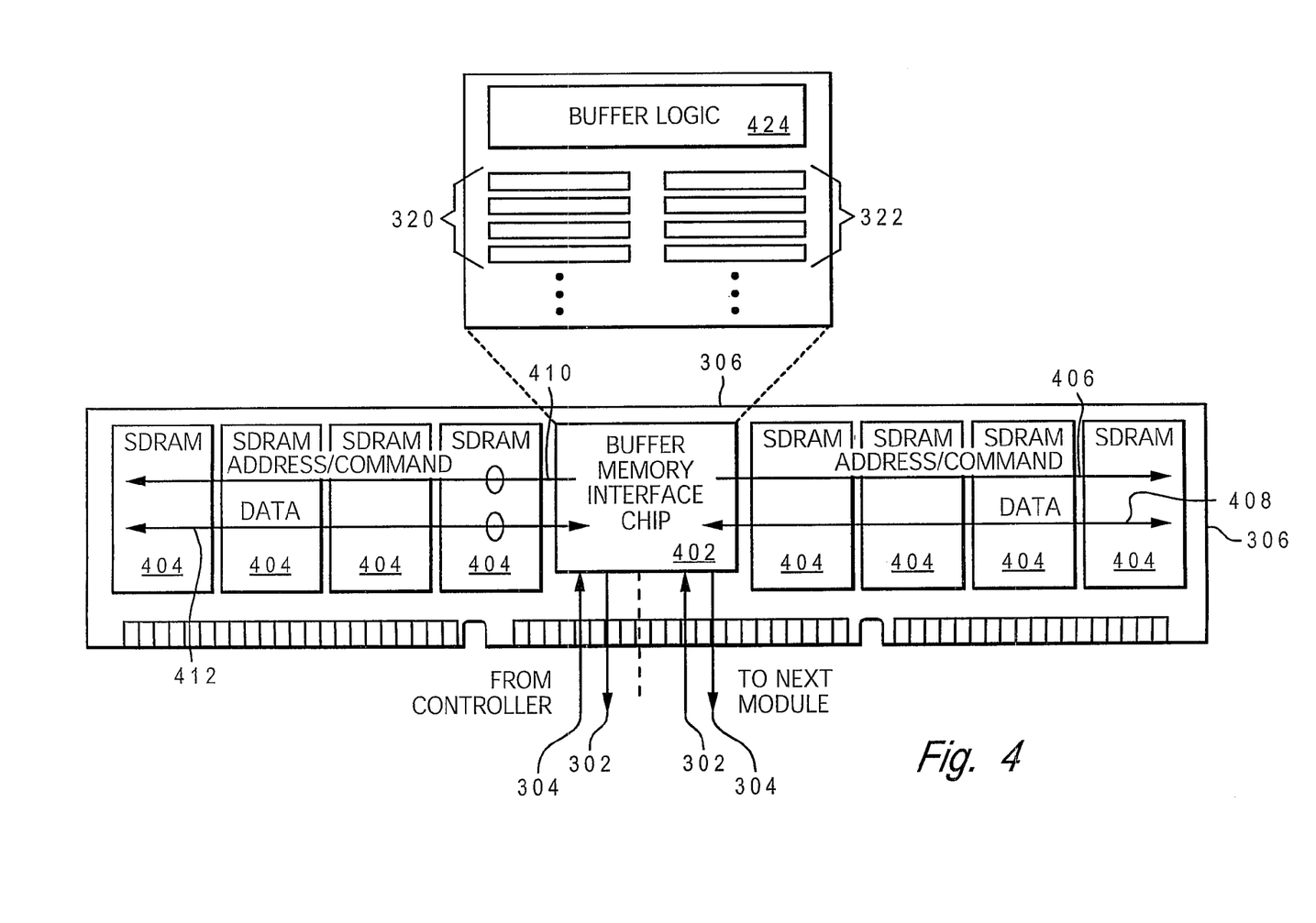
FIG. 4 depicts a buffered memory module with internal read buffers and on-module buses utilized to access the memory devices within one exemplary embodiment of the present invention.

FIG. 4 is a pictorial representation of a bus wiring scheme for a memory module within on-module buffers and control logic according to one embodiment of the invention. The primary signal flows are represented by shaded arrows and include the upstream memory bus (memory channel) 302, the downstream memory bus 304, memory device address and command busses 410 and 406, and memory device data busses 412 and 408.

In an exemplary embodiment of the present invention, illustrated by the insert above memory module 306, the buffer device 402, also referred to as a memory interface chip, includes multiple buffers and buffer logic. According to the invention, the buffers are designed with a delay logic/mechanism that enables the commands to be sent to the DRAMs ahead of time because the returning data is placed in the buffer and held until the pre-set number of cycles passes. Unlike a staging latch provided by some convention designs, the invention provides a complete/full holding buffer on each DIMM to allow the DIMM bus to retrieve data although the data bus is currently busy. Additional functionality and use of the buffers are described in greater details below.

The high speed upstream memory bus 302 and downstream memory bus 304 exit from the lower portion of the buffer device 402, and connect to a memory controller or other memory modules either upstream or downstream of this memory module 306, depending on the application. The buffer device 402 (or more specifically, buffer logic 424) receives signals that are four times the memory module data rate and converts them into signals at the memory module data rate.

Figure 5:
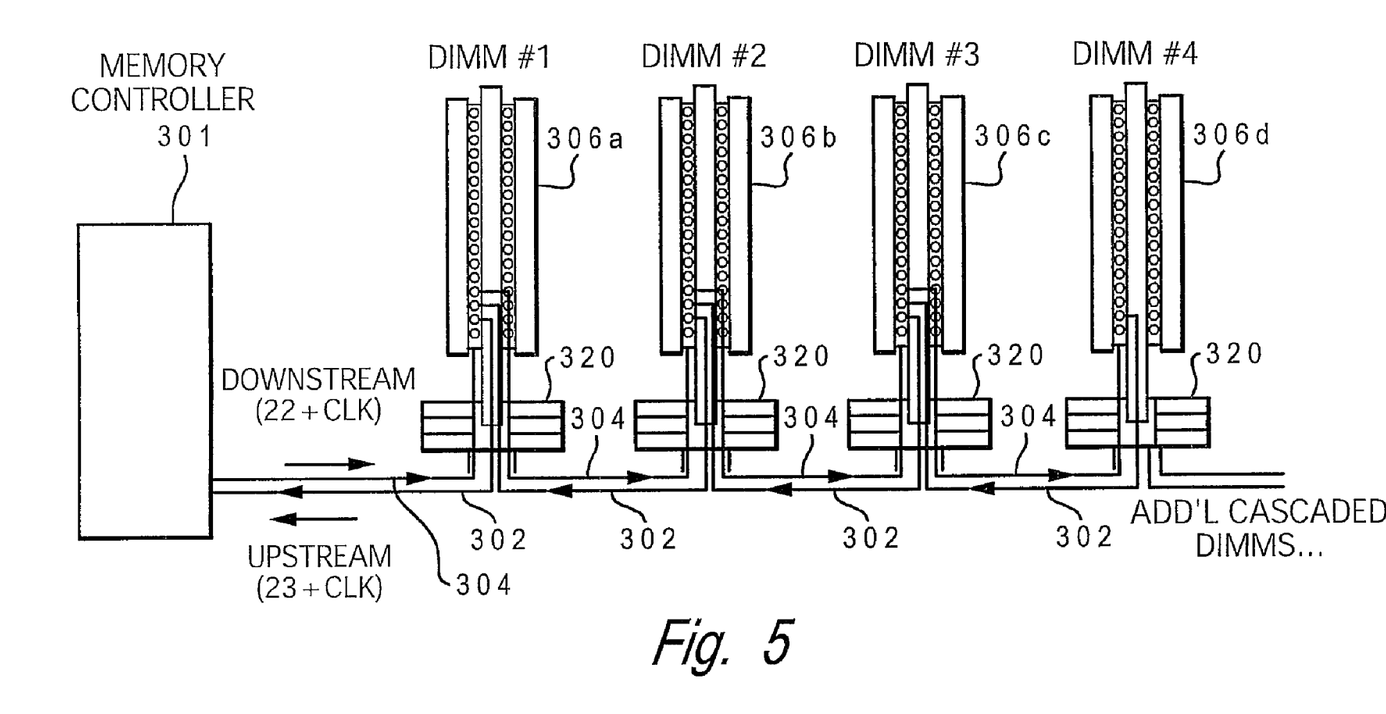
FIG. 5 illustrates cascaded memory modules of a memory subsystem with off-module read buffers within the backplane structure according to one embodiment of the invention.

FIG. 5 illustrates an alternate embodiment by which the functionality associated with buffers on the memory module maybe implemented. FIG. 5 provides a similar layout to FIG. 3A and like figures are numbered alike. Unlike FIG. 3A, which has a sequence of cascaded DIMMS with buffers on-module, the buffers 320, 322 and buffer logic (not shown) of FIG. 5 are provided on the backplane of the memory subsystem (i.e., off-module). This configuration enables memory modules to be dedicated to hosting memory devices and also enables larger buffer structures to support multiple buffered read data.

A full description of the process flow for providing positional read data latency is provided by the co-pending patent application (POU20040094US1; Ser. No. 10/903,178), which has been previously incorporated herein. Relevant portions of that description includes the description of the use of an outstanding read latency counter (ORLC) used by logic of the memory controller 301 to keep track of the remaining latency of the latest outstanding read operation, including all transfers of data within a burst. Also relevant is the description and use of a read data buffer delay (RDBD), which is an additional delay period, also referred to herein as an additional read data latency time period) for the target memory module that is calculated.

Streaming Reads for Early Completion

While the above method eliminates the inefficiencies inherent with biasing all read operations to complete at a worst case latency within the memory modules, while still preventing data collisions on the memory channel, the present invention focuses on maximizing the utilization of both the memory channel and the data buses of the memory modules, as described below. Further, the invention provides even greater overall efficiency by hiding the busy states of the memory modules due to early completion of reads at the memory modules. Also, the invention allows parallel processing of reads across memory modules and thus eliminates delays in waiting for a memory module to become idle before issuing a next read.

Busy states of a DRAM occur whenever the DRAM processes an operation (read/write) that requires data to be move in or out of the DRAM. Once the data is moved, a given number of cycles is required for the DRAM lines to recharge and become ready to accept a next operation (i.e., go to an idle state). Since a next operation cannot be completed at the DRAM until the DRAM goes to the idle state, speeding up the time at which idle state is achieved is a desirable result, which is achieved by the invention. The period before the DRAM is able to accept a new operation is referred to as a busy period.

As described throughout, exemplary embodiments of the present invention allows read commands to be issued by the memory controller as soon as possible without having to allow gaps in the command stream to prevent read data collisions. These gaps that are inserted (or allowed) in the prior art processing of reads from the memory controller were inserted to prevent data bus collisions. In the present invention, read commands are issued on each read cycle as long as a read operation within the memory module targets a non-busy memory module. This enables multiple reads to be in flight within the memory subsystem at the same time, and enables the memory devices to return from a busy state early. The early completion of reads further enables the accessed memory cells to be recharged for another read operation early enough to substantially reduce the delays in getting data from the DRAM in order to fill up the system data bus. Thus, exemplary embodiments of the present invention significantly reduce the occurrence of holes in the system data bus (or upstream read data transmissions).

Figure 6:
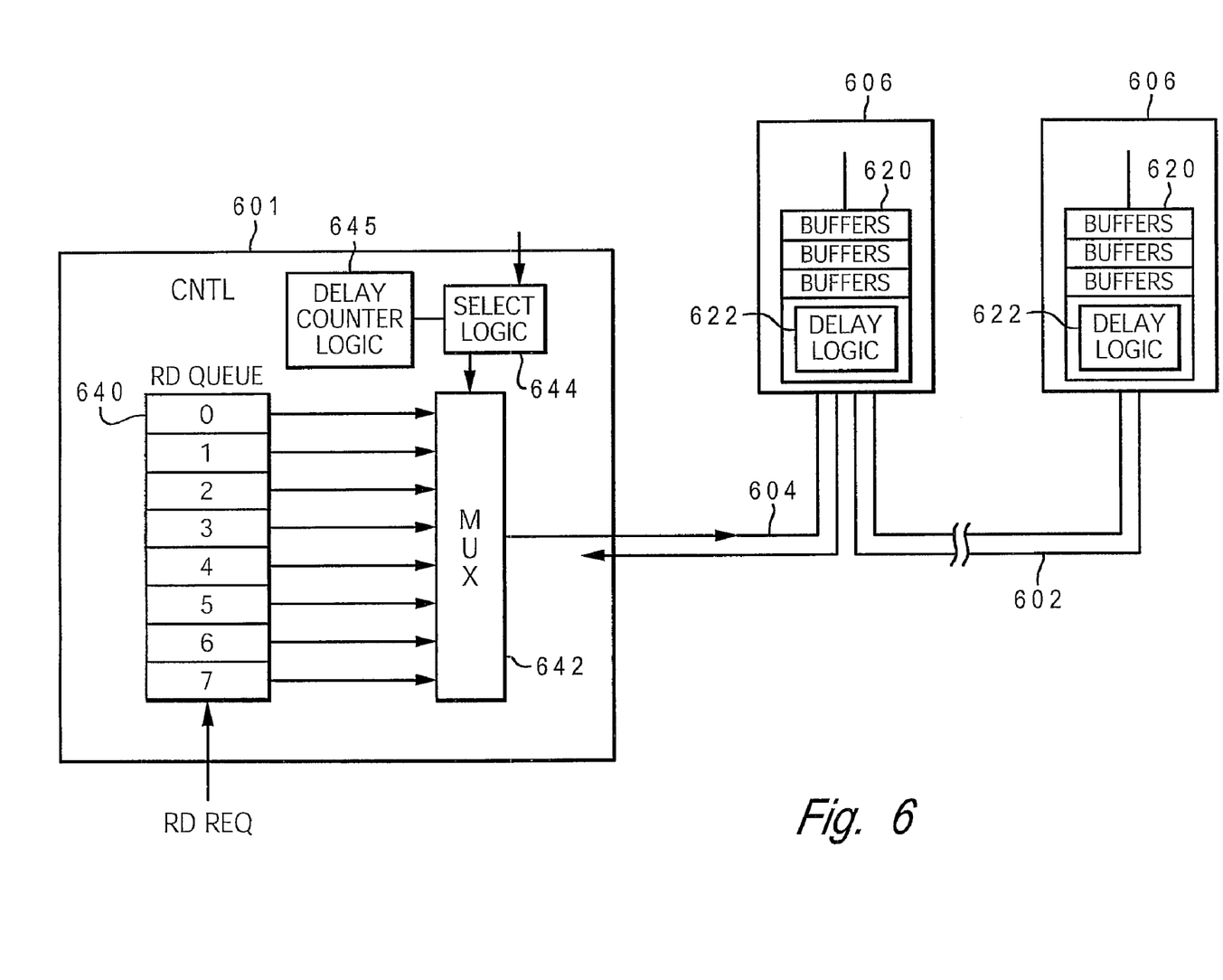
FIG. 6 depicts the memory controller with read reorder queue, select logic and delay counter logic in accordance with an exemplary embodiment of the present invention.

In order to accommodate the sequential issuing of multiple read commands being received at the memory controller targeting different memory modules, enhancements to the logic of memory controller are provided in the illustrative embodiment. FIG. 6 illustrates one possible configuration of the memory controller 601 and buffered memory modules 606 within a cascaded memory subsystem. As shown by FIG. 6, memory controller 601 includes a read queue 640, with eight slots for reads received at the memory controller 601. Memory controller 601 also includes a select logic 644 and a delay counter logic 645. Select logic 644 performs several functions, including: (1) track which memory modules are currently busy; (2) select the next read to be issued to the address/command/control bus; and (3) issue the next read at the next command cycle. In the illustrative embodiment, select logic 644 receives input from an external source that affects the selection process (either the read selected or the frequency of issuing new reads, e.g., every command cycle or every 2 command cycles, etc.).

Delay counter logic 645 provides the following functions: (1) track the number of delay cycles for a last issued read; (2) calculate a new number of delay cycles for a next scheduled read being issued to avoid any collisions on the memory channel; (3) associate the calculated delay value with the next scheduled read, such that the delay value is sent to the logic of the corresponding memory module; and (4) track the time to idle (TTI) for each memory module (i.e., the number of cycles before a busy memory module becomes idle).

The value of TTI enables a read targeting a particular memory module to be issued on a next read cycle that corresponds to X cycles before the memory module returns from the busy state following a previous read (or write) operation. In the illustrative embodiment, the value of X is the number of cycles required for the issued read command to reach the memory module. Thus, the read is issued while the memory module is still busy but arrives at the memory module just as the memory module goes to an idle state.

Unlike the RDBD of the related applications, which provides a delay directly correlated to the latency for returning the data of the previously issued read, the delay parameter of the present invention includes additional cycles because of the early processing of the read operations at the memory module. With multiple buffers at each memory module, it is conceivable that the read data has a delay value equal to the sum of multiple RDBDs if the read data is placed in one of the last available read buffers.

Returning now to FIG. 6, memory controller includes a MUX 642 utilized to enable select logic 644 to select any one of the available reads within the read queue 640. Select logic 644 determines, based on an analysis of the current utilization of the individual DIMMs within the memory subsystem, which of the N possible reads to issue next to the address/command/control system bus 604. The current utilization indicates which, if any, of the memory modules 606 is currently busy and is thus unable to handle a next scheduled read operation. Notably, as mentioned above, a "busy" memory module is not necessarily eliminated from receiving a next read, particularly if the memory module will be able to return to an idle state before a next issued read operation arrives at the memory module.

The read commands are issued to the memory subsystem in any order. Once select logic 644 completes its analysis and identifies one or more reads that are eligible to be issued to idle (or soon to be idle) memory modules with available buffers, the selection logic will issue the read to the memory channel. Additional read commands that are identified as targeting memory banks or modules that are not busy will be issued in a sequential manner without gaps in the command cycles. In one embodiment, priority is given to the oldest command within the queue, and thus a measure of the time order for each read is also maintained by the selection logic.

Figure 7A:
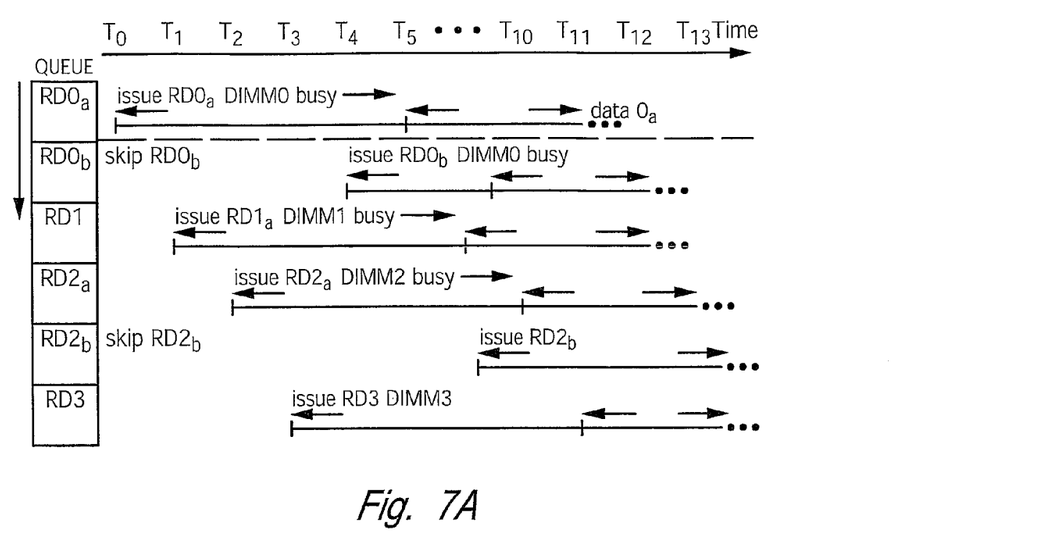
FIG. 7A is a timing diagram illustrating the issuing of reads to idle memory modules on sequential command cycles, according to one illustrative embodiment of the invention.
Figure 7B:
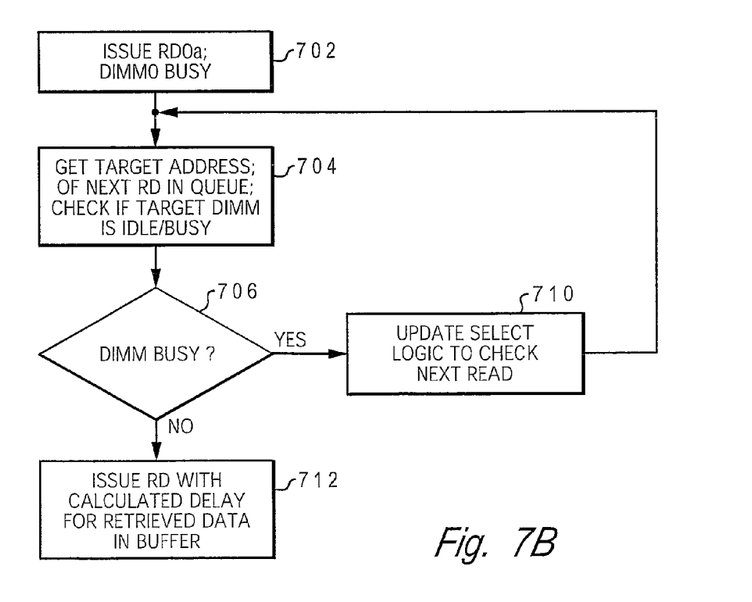
FIG. 7B is a flow chart of the process of issuing reads in sequence to enable parallel, early processing of reads within the memory subsystem according to one embodiment of the present invention.

Referring now to FIGS. 7A and 7B. FIG. 7A illustrates a time line for several reads (RD0$a$, RD0$b$, RD1, RD2$a$, RD2$b$, RD0$c$ and RD3) that are received sequentially at the memory controller. The numbers indicate the corresponding DIMM to which the reads are addressed, i.e., DIMM0, DIMM1, DIMM2, and DIMM3. Subscripted letters indicate several reads targeting the same memory module. These reads are received according to their alphabetical order. For example, RD0$a$ and RD0$b$ represent two read targeting the same memory module, DIMM0, with RD0$a$ being received first. For illustration, time T0, T1, etc, are assumed to be read cycles and not actual cycles. Thus if each read command takes 4 cycles to be issued to the address/command bus, T1 is exactly 4 cycles after T0, T2 is also 4 cycles after T1, and so on.

Similar to those described above, each memory module has multiple read buffers utilized to delay the retrieved data a pre-calculated number of cycles. As also described above, selection logic within the memory controller selects a next earliest received read that targets an idle (or soon to be idle) memory module and associates a delay parameter with that read command.

FIG. 7B provides a flow chart of the process of selecting the reads and issuing the reads early based on the business of the corresponding memory modules. As is illustrated by the figures, when an earlier received read targets a busy memory module, the next reads targeting idle memory modules are selected out of order and issuing to the system bus. This enables greater utilization of idle bus bandwidth (at the memory modules) and thus maximizes the overall bus utilization of the memory subsystem. Also, the presence of a busy memory module does not hold up the early processing of latter reads at other memory modules.

Turning now to the figures, at time T0 (corresponding to block 702), RD0$a$ is first issued to DIMM0 and causes the target memory module (DIMM0) to go into a busy state as RD0$a$ is processed. DIMM0 receives RD0 and initiates a process to the retrieve the requested for data and buffer/return the data. DIMM0 remains busy until the DRAM recharges (at time T4), although the data is only returned some time later (T18) based on the delay parameter associated with the read command. Once RD0$a$ is issued, the select logic obtains the target address of the next read in the queue (block 704) and then determines whether the corresponding memory module is in an idle (or soon to be idle) state (block 706). If the target memory module is busy, the logic moves on to the next read in the read queue (block 710). The select logic iterates through this checking process until it locates a read request within the read queue targeting an idle memory module.

In one embodiment, the select logic tracks the busy state of each memory module. When selecting a next read, the logic compares the target address of the read to the list of busy/idle DIMMs. According to the illustration, RD0*b* is the next request in line (based on the time received by the memory controller). However, the selection logic recognizes that the target memory module, DIMM0, is busy. RD1 in, contrast, targets data in DIMM1, which is currently idle.

At time T1, the select logic issues the next read (i.e., RD1) within the queue with an idle target memory module (DIMM1) (block 712). The issued read includes the calculated delay for retrieved data that is to be stored within a buffer. The delay value is 0 and the data is not buffered for earlier reads or when the system data bus is not being utilized and has no read data scheduled to be placed thereon.

Notably, RD0*b* is skipped since DIMM0 is busy at time T1. RD2*a* is then issued at the next read cycle T2, RD2*b* is skipped and RD3 issued at time T3. At time T4, DIMM0 enters the soon to be idle state and DIMM0 becomes idle at time T5. Thus, RD0*b* is issued at time T4 or T5 depending on the specific implementation being utilized.

According to the timing diagram, at times T3 and T4, all four DIMMs are processing reads in a somewhat parallel mode. The overlap occurs because the time to process the reads at the memory modules is longer than the transmission latency of each read command. DIMM0 moves to an idle state at time T5, DIMM1 at time T6, etc. so the cycle of issuing reads in sequence may be completed again. The cycle at which data is returned is, however, DIMM-specific, and is thus different for each memory module.

In the prior art, the memory controller waits until DIMM0 is no longer busy before issuing RD0*b*, and RD1 is only issued after RD0*a* had been processed. With the present invention, however, the selection logic picks RD1 as the next read to issue, and RD1 is issued to the memory modules at the next issuing cycle. RD0*b* is retained within the read reorder buffer until DIMM0 is no longer busy. Then, RD0*b* is issued to DIMM0.

The next read command targeting the DIMM may be sent to the DIMM while the data of the previous read command is still within the DIMM's buffer. Each data stored in respective buffers have their corresponding delay times. If all the buffers of a memory module are filled, the memory module is made to appear busy by the selection logic so that no further reads are sent to that memory module until the data of at least one of the buffers is placed on the system data bus.

As shown by the timing diagram, RD1 triggers DRAM1 to initiate data retrieval almost immediately after RD0 initiates its data retrieval. However, the data that is retrieved from each DRAM is immediately placed within the respective read data buffers and not placed on the data bus until the delay period expires. Since the delay period is pre-calculated to prevent any collisions on the bus, the data of RD1 is not placed on the bus until after the pre-determined number of cycles required for the data of RD0 to be placed on the bus.

Improved efficiency in utilization of both the system bus and memory module buses are provided by the above described streaming of consecutive reads to idle memory modules. Retries on the system address bus are substantially eliminated, while bandwidth on the data bus of an idle memory module is more quickly allocated for use and reuse. Additionally, the usage of the read buffers at the memory module enables actual time delays that enable the early retrieved data does not cause a collision on the system data bus.

One feature of the invention enables parallel processing of reads that are streamed to multiple buffered memory modules on consecutive read cycles. Multiple DIMMs actively process read operations early and then become idle early to enable even earlier processing of later reads. One benefit of this approach is that the depth of the read queue may be decreased as the reads are streamed to the memory modules almost as soon as they arrive at the memory controller.

With the address/command bus being utilized for every read cycle (while there are reads within the read queue targeting idle DIMMs) and both the system data bus and memory module data buses being continuously fed with retrieved data, very few holes occur within the memory subsystem and the invention allows the overall utilization of the system buses to be maximized, while effectively hiding busy period on the memory modules.

Hiding Write Operations

In addition to the above described developments in handling read operations within the memory subsystem, the invention further provides a method and system for efficiently completing write operations within a memory subsystem without without adversely affecting the completion of issued reads and return of read data from buffered memory modules. Each memory module (e.g., DIMM) includes memory devices (e.g., DRAMs), multiple write buffers, and control logic. The write buffers are utilized to temporarily hold write data before the write data are written to the memory device.

Two write operations are provided by the memory controller in place of each received write. A "write-to-buffer" operation moves write data from the memory controller to one of the write buffers within the memory module. Then, a "write" (address-only) operation is later issued to write the buffered write data to the memory device.

Using the write-to-buffer command, write data may be issued to a memory module event though the target memory module is busy processing reads. Since the write data are sent to the write buffers of the memory module, the processing of reads is not affected, and the process of forwarding the write data is thus hidden behind ongoing read operations. This function of forwarding data to buffers of each of the memory modules is continuously completed in the background regardless of the busy state of the respective DIMMS that are targeted.

The latter, address-only write commands to different buffered memory modules are re-ordered so that the writes targeting idle DIMMS are issued ahead of writes targeting DIMMS that are busy (or soon to be busy). Idle DIMMs are determined by controller logic, which also controls the issuance of writes and reads to the various DIMMs. In one embodiment, the controller logic determines that a DIMM is idle when the read queue of the memory controller does not contain any reads that target the particular DIMM to which the write operation is addressed.

Moving the data via a background write-to-buffer operation increases the efficiency of the common write data channel by allowing write data to be moved to the buffers in the memory modules even though there are no idle memory devices to currently accept the associated write operation. This feature allows the write data bus to reach maximum bandwidth during periods of heavy read activity, and the actual write operations to the memory devices are deferred to periods of light read activity, where the buffered data is able to be written in parallel across multiple memory modules simultaneously.

Figure 8A:
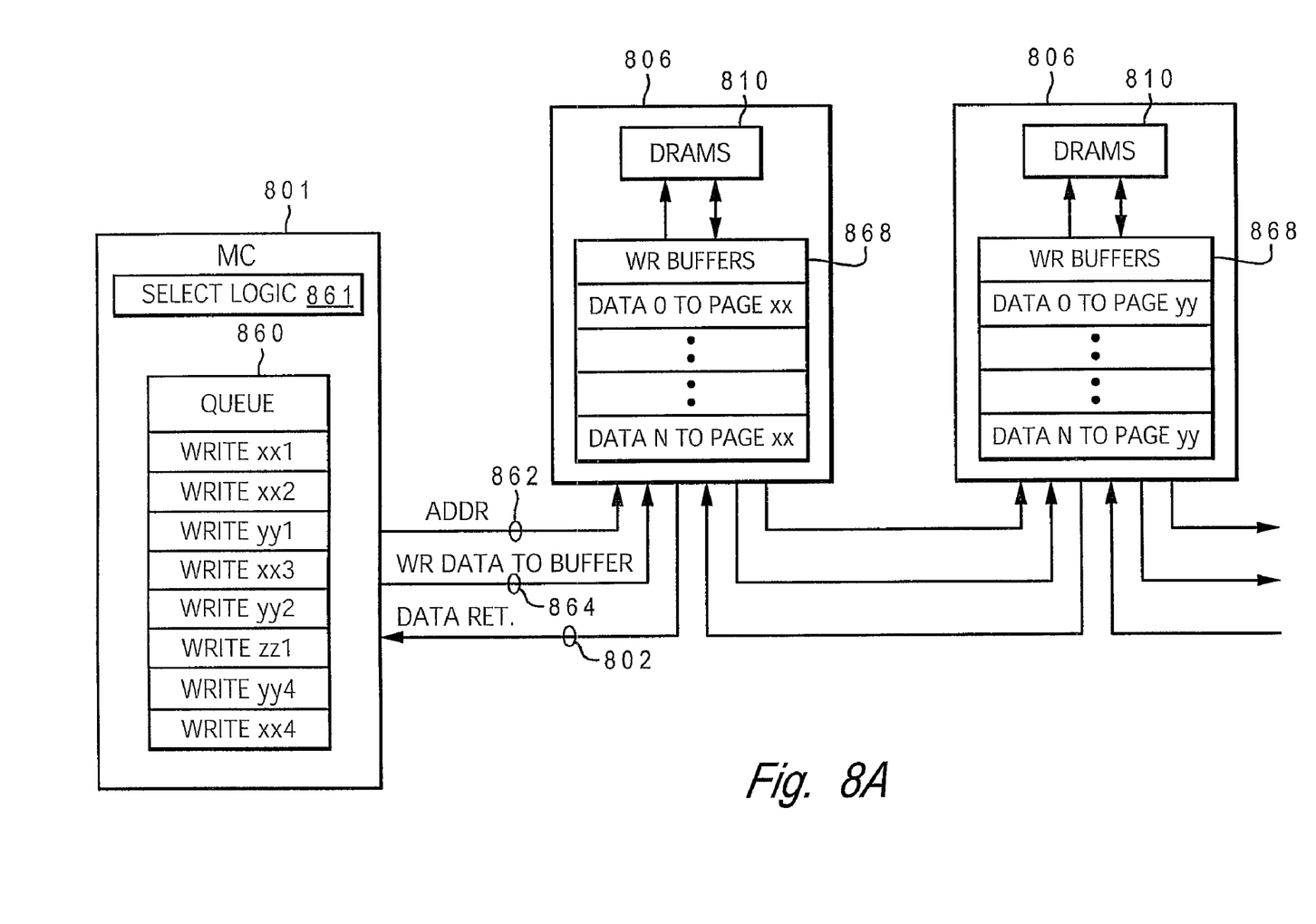
FIG. 8A illustrates a memory subsystem with write reorder queue and a series of write buffers associated with each memory module according to exemplary embodiments of the present invention.

FIG. 8A illustrates a memory subsystem configured with write re-order queue and select logic within the memory controller. As illustrated, memory subsystem includes a single address/command bus 862 and a write data bus 864, over which read/write addresses and write data are respectively transmitted to memory modules 868. Within memory controller 801 is write re-order queue 860 and select logic 861. Write re-order queue 860 receives all writes in a particular time sequence/order. Select logic 861 is utilized to choose writes (write command) from write re-order queue 860 to issue, and may select writes out-of-order based on the busy state of the memory module(s) targeted by the respective writes.

In one embodiment, the select logic 861 determines that a DIMM 806 is idle when there are no reads pending within the read queue targeting the particular DIMM to which the write operation is addressed. In one dynamic implementation, when a write operation is initially received, the data associated with the write is immediately forwarded to the target memory module on the next available data cycle. The address-only write commands are then held within the write re-order queue until the select logic issues the write command to the address/command bus.

Prior to forwarding a write command, the select logic first determines if the memory module (DIMM 806) addressed by the write command is idle by checking the read queue to determine if there are any reads sent or queued to be sent to the particular memory module. In an associated embodiment, after the select logic determines that the path is clear for issuing the write command, the logic waits a pre-programmed (or dynamically programmable) number of cycles (e.g., 4 cycles) before placing the write command on the address/command bus 862. The wait period allows the select logic to confirm that no reads arrive at the memory controller targeting the same DIMM, since reads are given priority over writes.

The actual length of the wait period (number of cycles) before issuing the write command to the idle DIMM is a variable parameter. According to one implementation, the parameter value is a programmable delay that enables existing data on the data bus to be completely transferred to the memory controller before the write data is place on the write data bus 864 to the DIMM. The parameter may be dynamically adjusted using either hardware or software instrumentation to dynamically tune the select logic to the memory subsystem's current workload/traffic patterns.

Earlier received writes may be held by the memory controller within the write re-order queue until the targeted DIMM is no longer busy or the write is forced out because of an address conflict with a latter received read. In one embodiment, described in greater details below, the writes are not issued until the write buffers in the target DIMM are full with write data.

The invention overcomes the limitations of conventional designs, which utilize one bidi bus to all DIMMs. In a conventional system once the memory controller began issuing writes, no reads could be issued at all because the memory system only had one bidi bus. With the memory modules used in this memory subsystem, multiple bidi busses are present between the memory module and the DRAM. This allows both writes and reads within a memory subsystem to occur in parallel.

The writes are re-ordered to optimize the use of the write data bus and target those DIMMs that are idle rather than waiting to write to other DIMMs that are busy. The invention recognizes that the processor's priority is to get read data back from the memory subsystem via memory channel 802. The memory controller is thus configured with the write re-order queue, which allows the select logic to fit the received writes into the processing allocated to reads without negatively affecting those read operations targeting the same memory modules. A least intrusive execution of the write command (from the perspective of read command completion) is therefore provided.

When combined with the above described streaming of reads for early completion, the features of the present invention enables the memory controller logic to more efficiently dispose of both read and write operations within the memory subsystem. Reads within the read queue are prioritized over the writes, while data corresponding to writes in the write queue are forwarded in the background to the buffers to enable faster completion of writes once the DRAM enter an idle state.

Thus, when the select logic determines that no read operations are being performed on a particular DIMM, and no read operations are pending for that DIMM and the DRAMs are in a state that can be written the queued write commands are immediately scheduled to be issued. If all writes can be issued and completed when no reads are pending in the memory controller, the writes can be issued without any negative impacts to reads. In this case, writes are delayed till all reads to that DIMM are completed and none are pending. While this DIMM might be writing data, other DIMMs in the system can be executing new read commands allow both reads and writes to be completed in parallel.

Single Burst Completion of Multiple Writes at Buffered DIMMs

Another embodiment of the invention provides a method and a system for efficiently handling completion of multiple writes within a memory subsystem that comprises a memory controller coupled to multiple, buffered memory modules (buffered DIMMs) in a daisy chain topology. Multiple write buffers are provided within each DIMM and are utilize to buffer multiple received write data forwarded to the memory device (e.g., a DRAM) of the DIMM via a write-to-buffer data operation.

Two write processes are completed for each write received at the memory controller, the write-to-buffer (data) operation followed by an address-only write command. When a write is received at the memory controller, rather than individually completing the write in one continuous operation at the target memory module, the memory controller first issues the write-to-buffer (data) operation on a next free cycle of the write data bus (i.e., a cycle at which no other write data is currently on the bus). The control logic at the DIMM receives the data corresponding to the write-to-buffer operation and places the data within one of the write buffers. Multiple writes targeting the same DIMM are thus buffered.

When all of the available buffers at a memory module are full, the memory controller issues the address only write command to the memory module. The control logic of the DIMM reconfigures the data bus for a write operation and streams all of the buffered write data to the memory device(s) in one continuous burst. By buffering multiple writes and then writing all buffered write data within the DIMM in a single burst, the number of write-to-read turnaround penalty of the memory module's data bus is substantially minimized as explained in patent Ser. No. 11/054,372. If a read to the Dram enters the read queue, the flush of writes will stop to prevent further delaying the read.

In one embodiment, the write command is sent even if there are reads pending to a DIMM if sufficient read data is queued up to prevent an empty gap on the memory channel back to the processor. For example, a write may be trigged by the memory device's data bus being way ahead in its processing of reads that were sent early or has a full read buffer, preventing the processing of additional reads that may be within the read queue. In this latter embodiment, because the reads are completed so far ahead of the actual time their data are required, future reads are not negatively affected (from an overall system standpoint) by the latency involved in the turnaround time for reconfiguring the data bus for writes, dumping several buffers of data to the memory device all at once, (either to the same DIMM or to different DIMMs) then reconfiguring the data bus for reads.

As previously shown (FIG. 4), write and read commands at the DIMM are carried on a unidirectional address/command bus, and a bi-directional data bus carries the write data to the DRAMs and read data away from the DRAMs. Conventionally, reconfiguring the data bus from handling writes to handling reads, and vice versa, takes up a significant amount of time (registered as busy time by the DIMM) and ultimately leads to inefficiency in the memory subsystem, i.e., large gaps/holes on the data bus.

The present invention minimizes both the effects of this reconfiguration on overall system performance and the inefficiency of completing writes as individual writes. That is, the invention maximizes use of data bus bandwidth by performing writes only when they can be issued without intruding on read operations. or when the write operation does not adversely affect the latency of returning data from a previously issued or pending read operation at the particular memory module. Execution of multiple writes to the same page in sequence (i.e., completing writes in bursts, rather than individually) provides a more efficient use of the bus by minimizing the number of and overall bus penalties associated with reconfiguring the DRAM data bus from write-to-read and vice versa.

FIG. 8A illustrates one embodiment of the invention, which provides a number of buffers 868 bridging the transfer of writes from the memory controller 811 to each DIMM 806. As shown, each buffer on a memory module is sent write data addressed to a DRAM of that module (e.g., page xx or yy of memory), and the write data is compiled within the write buffers 868 before being sent to the particular DRAM 810.

One embodiment of the invention is implemented within a synchronous DRAM having 2 or 4 banks. When access to the banks is required, the page number cannot be changed. Thus, the memory controller checks the target address of the writes and determines which writes are addressed to the same page. These write commands are then issued is sequence to the memory module to enable the buffered write data corresponding to these writes to update the same page of the DRAM in a single continuous update. All writes to a single page are run/completed concurrently (in sequence) rather than individual writes at different times.

According to one embodiment, write data addressed to the particular DIMM are placed in the buffer 868 and held in the buffer 868 until the buffer 868 is filled or one of a number of trigger conditions occurs. Two of these events have been previously described. An additional trigger event that may be programmed is the occurrence of an address conflict, where both the write and a pending read targets the same address within the DIMM. In this case, irrespective of the number of write data that have been buffered, the contents of the write buffer are written via a single continuous burst of writes to the DRAM.

Figure 8B:
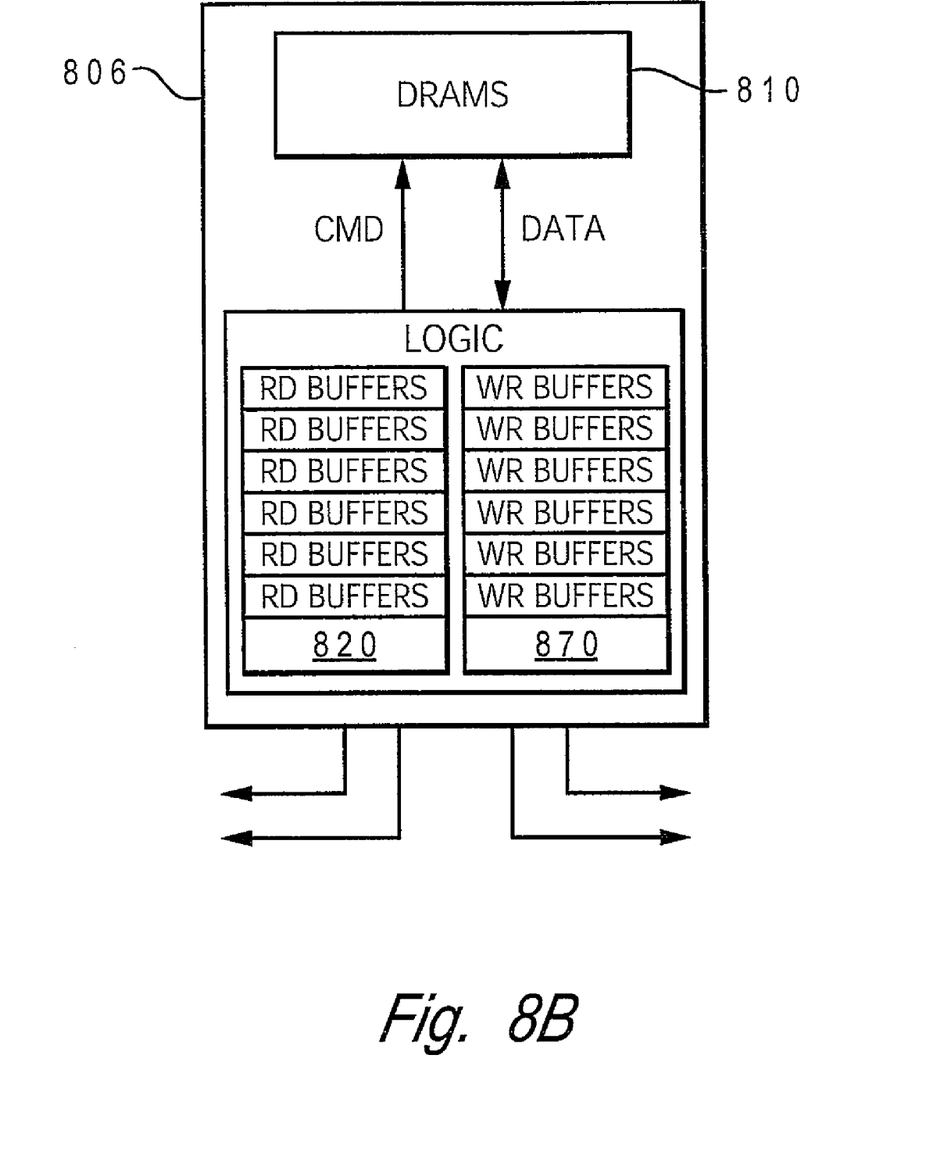
FIG. 8B illustrates memory modules with write buffers for buffering multiple writes according to exemplary embodiments of the invention.

As shown by FIG. 8B, one implementation of the invention provides write buffers 870 in addition to the above described read buffers 820 within each memory module. These write buffers 870 store only write operations targeting the specific memory module. Because the buffers are on the memory module, little or no latency is involved in completing the write to the DRAMs once the bus lanes are configured. FIG. 5 also illustrates an alternative configuration, where the write buffers may be placed on the backplane proximate to the location at which the DIMMS are plugged in.

Utilization of buffered DIMMs, with both read and write buffers, allows the faster completion of writes that target a DIMM that has no pending reads in the read reorder queue. Notably, with the buffered write implementation, the individual write data may be held a predetermined number of cycles to enable the buffers to fill up before any data are transferred to the DRAMs. The wait cycle is a design parameter, which is controlled by the memory controller logic. In one embodiment, the number of cycles of the last read delay parameter is factored into the wait time to filling up the write buffers. The efficiency gained by issuing a full set of buffered write data in a single burst allows this wait to not negatively affect the benefits of early streaming of reads on consecutive read cycles, as described above.

The embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention.

The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A memory subsystem comprising:
a memory controller that receives and controls the processing of write operations and read commands;
a plurality of memory modules coupled to said memory controller in a cascaded configuration, each memory module having multiple write buffers for temporarily holding write data; logic within the memory controller for immediately forwarding write data addressed to a memory module to an available one of the multiple write buffers of the memory module; and logic within the memory controller for issuing a write address to complete a write of the buffered data at a later command cycle at which the memory module is no longer in a busy state.

2. The memory subsystem of claim 1, wherein the logic for issuing the write address includes logic for determining when the memory module is no longer in a busy state by: tracking when all previously issued read operations targeting the memory module have completed processing the retrieval of data from the memory module and the memory module has gone to an idle state; and determining when no read commands targeting the memory module are pending within the memory controller.

3. The memory subsystem of claim 1, further comprising logic for determining when a target memory module of a write operation is busy.

4. The memory subsystem of claim 3, further comprising next logic, when the target memory module is busy, for delaying the issuance to a memory channel of a first write address of the write operation and selecting a next, later received, write address of a write operation targeting an idle memory module to issue to an address/control bus ahead of the first write address, wherein write data is forwarded to the write buffers during busy states of the target memory module but is only allowed to be written to the memory module during a subsequent idle state.

5. The memory subsystem of claim 1, further comprising: a select logic associated with the memory controller that selects which write and read commands to issue to respective ones of the plurality of memory modules; and wherein the select logic only forwards a write command to a memory module that is not busy and which does not have a pending read operation within the memory controller or enough read data is buffered up in the memory module to hide write operations on a bi-directional memory bus.

6. The memory subsystem of claim 1, wherein said write data is forwarded to the respective buffer(s) at a next available hole on the write data bus and the busy state of the memory module to which the write data is sent does not affect a time at which the write data is forwarded to that memory module.

7. The memory subsystem of claim 1, wherein said logic for forwarding places write data in sequence on a write data bus up to a maximum bandwidth during periods of heavy read activity, defers an associated write operation to memory devices to periods of light read activity, wherein buffered write data may be written in parallel across multiple memory modules simultaneously.

8. A data processing system comprising:
a processor;
a memory subsystem coupled to the processor and receiving write operations and read commands from the processor, said memory subsystem including:
a memory controller that receives and controls the processing of write operations and read commands;
a plurality of memory modules coupled to said memory controller in a cascaded configuration, each memory module having multiple write buffers for temporarily holding write data;
logic within the memory controller for immediately forwarding write data addressed to a memory module to an available one of the multiple write buffers of the memory module; and
logic within the memory controller for issuing a write address to complete a write of the buffered data at a later command cycle at which the memory module is no longer in a busy state.

9. The data processing system of claim 8, wherein the logic for issuing the write address includes logic for determining when the memory module is no longer in a busy state by: tracking when all previously issued read operations targeting the memory module have completed processing the retrieval of data from the memory module and the memory module has gone to an idle state; determining when no read commands targeting the memory module are pending within the memory controller; and determining if sufficient read data is buffered up to hide all negative effects of issuing a write command.

10. The data processing system of claim 8, said memory subsystem further comprising logic for determining when a target memory module of a write operation is busy.

11. The data processing system of claim 10, further comprising next logic, when the target memory module is busy, for delaying the issuance to the memory channel of a first write address of the write operation and selecting a next, later received, write address of a write operation targeting an idle memory module to issue to an address/control bus ahead of the first write address, wherein write data is forwarded to the write buffers during busy states of the target memory module but is only allowed to be written to the memory module during a subsequent idle state.

12. The memory subsystem of claim 8, said memory subsystem further comprising:
a select logic associated with the memory controller that selects which write and read commands to issue to respective ones of the plurality of memory modules; and
wherein the select logic only forwards a write command to a memory module that is not busy and which does not have a pending read operation within the memory controller.

13. The data processing system of claim 8, wherein said write data is forwarded to the respective buffer(s) at a next available hole on a write data bus and the busy state of the memory module to which the write data is sent does not affect a time at which the write data is forwarded to that memory module.

14. The data processing system of claim 8, wherein said logic for forwarding places write data in sequence on a write data bus up to a maximum bandwidth during periods of heavy read activity, defers an associated write operation to memory devices to periods of light read activity, wherein buffered write data may be written in parallel across multiple memory modules simultaneously.

* * * * *